US009921973B2

(12) United States Patent
Benhase et al.

(10) Patent No.: US 9,921,973 B2
(45) Date of Patent: *Mar. 20, 2018

(54) CACHE MANAGEMENT OF TRACK REMOVAL IN A CACHE FOR STORAGE

(71) Applicant: International Business Machines Corporation, Armonk, NY (US)

(72) Inventors: Michael T. Benhase, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/787,584

(22) Filed: Mar. 6, 2013

(65) Prior Publication Data

US 2013/0185514 A1 Jul. 18, 2013

Related U.S. Application Data

(63) Continuation of application No. 13/352,218, filed on Jan. 17, 2012.

(51) Int. Cl.
G06F 12/12 (2016.01)
G06F 12/123 (2016.01)
G06F 12/0866 (2016.01)
G06F 17/30 (2006.01)

(52) U.S. Cl.
CPC ........ G06F 12/123 (2013.01); G06F 12/0866 (2013.01); G06F 17/3048 (2013.01)

(58) Field of Classification Search
CPC .......................... G06F 12/0866; G06F 17/3048
See application file for complete search history.

(56) References Cited

U.S. PATENT DOCUMENTS 5,353,425 A 10/1994 Malamy et al.
5,809,527 A * 9/1998 Cooper et al. ................ 711/133
6,073,076 A 6/2000 Crowley et al.
(Continued)

FOREIGN PATENT DOCUMENTS

CN 1967507 5/2007

OTHER PUBLICATIONS

Preliminary Amendment dated Mar. 3, 2013, pp. 7, for U.S. Appl. No. 13/352,218, filed Jan. 17, 2012.
(Continued)

Primary Examiner — Charles Rones
Assistant Examiner — Tian-Pong Chang
(74) Attorney, Agent, or Firm — William K. Konrad; Konrad Raynes Davda & Victor LLP

(57) ABSTRACT

In one embodiment, a cache manager releases a list lock during a scan when a track has been identified as a track for cache removal processing such as demoting the track, for example. By releasing the list lock, other processors have access to the list while the identified track is processed for cache removal. In one aspect, the position of the previous entry in the list may be stored in a cursor or pointer so that the pointer value points to the prior entry in the list. Once the cache removal processing of the identified track is completed, the list lock may be reacquired and the scan may be resumed at the list entry identified by the pointer. Other features and aspects may be realized, depending upon the particular application.

7 Claims, 5 Drawing Sheets

(56) References Cited

U.S. PATENT DOCUMENTS

| | | | |
|---|---|---|---|
| 6,785,771 B2* | 8/2004 | Ash et al. | 711/136 |
| 6,862,663 B1 | 3/2005 | Bateman | |
| 7,188,170 B1* | 3/2007 | Burnley et al. | 709/224 |
| 8,458,402 B1* | 6/2013 | Karnik | G06F 12/0804 |
| | | | 711/118 |
| 2003/0105928 A1* | 6/2003 | Ash | G06F 12/0804 |
| | | | 711/136 |
| 2003/0149843 A1* | 8/2003 | Jarvis | G06F 12/123 |
| | | | 711/133 |
| 2007/0118695 A1* | 5/2007 | Lowe et al. | 711/136 |
| 2007/0168617 A1* | 7/2007 | Borkenhagen | G06F 12/128 |
| | | | 711/133 |
| 2008/0034156 A1* | 2/2008 | Kawaguchi et al. | 711/114 |
| 2008/0040553 A1* | 2/2008 | Ash | G06F 11/1076 |
| | | | 711/133 |
| 2008/0195807 A1* | 8/2008 | Kubo et al. | 711/114 |
| 2011/0238927 A1* | 9/2011 | Hatano | 711/145 |
| 2012/0303899 A1* | 11/2012 | Ash | G06F 12/0866 |
| | | | 711/119 |
| 2012/0323872 A1* | 12/2012 | Vasquez Lopez | G06F 17/30132 |
| | | | 707/704 |
| 2012/0324173 A1* | 12/2012 | Benhase | G06F 12/121 |
| | | | 711/141 |
| 2013/0185513 A1* | 7/2013 | Benhase | G06F 12/123 |
| | | | 711/136 |

OTHER PUBLICATIONS

Office Action dated Aug. 30, 2013, pp. 40, for U.S. Appl. No. 13/352,218, filed Jan. 17, 2012.
Final Office Action 1 for U.S. Appl. No. 13/352,218, dated Mar. 27, 2014, 35 pp. [(FOA1)].
Response to Final Office Action 1 for U.S. Appl. No. 13/352,218, dated Jun. 27, 2014, 12 pp. [(RFOA1)].
Response dated Dec. 2, 2013, pp. 10, to Office Action dated Aug. 30, 2013, pp. 40, for U.S. Appl. No. 13/352,218, filed Jan. 17, 2012.
Office Action dated Sep. 30, 2014, pp. 37, for U.S. Appl. No. 13/352,218, filed Jan. 17, 2012.
Response dated Dec. 26, 2014, pp. 11, to Office Action dated Sep. 30, 2014, pp. 37, for U.S. Appl. No. 13/352,218, filed Jan. 17, 2012.
Office Action dated Apr. 30, 2015, pp. 10, for Chinese Application No. 201310016323.5, filed Jan. 17, 2013.
English translation of Chinese Patent CN 1967507 dated May 23, 2007.
Information Materials for IDS dated May 11, 2015, pp. 2.
Final Office Action dated Apr. 7, 2015, pp. 35, for U.S. Appl. No. 13/352,218, filed Jan. 17, 2012.
Response dated Jun. 8, 2015, pp. 12, to Final Office Action dated Apr. 7, 2015, pp. 35, for U.S. Appl. No. 13/352,218, filed Jan. 17, 2012.
Office Action dated Sep. 17, 2015, pp. 44, for U.S. Appl. No. 13/352,218, filed Jan. 17, 2012.
Response dated Dec. 12, 2015, pp. 12, to Office Action dated Sep. 17, 2015, pp. 44, for U.S. Appl. No. 13/352,218, filed Jan. 17, 2012.
Office Action dated Mar. 9, 2016, pp. 37, for U.S. Appl. No. 13/352,218, filed Jan. 17, 2012.
Response dated May 11, 2016, pp. 11, to Office Action dated Mar. 9, 2016, pp. 37, for U.S. Appl. No. 13/352,218, filed Jan. 17, 2012.
Supplemental Response Jun. 9, 2016, pp. 12, to Final Office Action dated Mar. 9, 2016, pp. 37, for U.S. Appl. No. 13/352,218, filed Jan. 17, 2012.
RCE Response dated Jul. 8, 2016, pp. 13. to Office Action dated Mar. 9, 2016, pp. 37, for U.S. Appl. No. 13/352,218, filed Jan. 17, 2012.
Office Action dated Sep. 9, 2016, pp. 43, for U.S. Appl. No. 13/352,218, filed Jan. 17, 2012.
Response dated Mar. 9, 2016, pp. 11, to Office Action dated Sep. 9, 2016, pp. 43, for U.S. Appl. No. 13/352,218, filed Jan. 17, 2012.
Final Office Action dated Apr. 3, 2017, pp. 22, for U.S. Appl. No. 13/352,218, filed Jan. 17, 2012.
Response dated Jun. 6, 2017, pp. 09 to Final Office Action dated Apr. 3, 2017, pp. 22, for U.S. Appl. No. 13/352,218, filed Jan. 17, 2012.
Notice of Allowance dated Jun. 21, 2017, pp. 16, for U.S. Appl. No. 13/352,218, filed Jan. 17, 2012.
H. Wei, et al., "A Data Centered Approach for Cache Partitioning in Embedded Real-Time Database System", 2008, pp. 1-7.
X. Ding, et al., "BP-Wrapper: A System Framework Making Any Replacement Algorithms (Almost) Lock Contention Free", IEEE, 2009, pp. 369-380.
Z. Tari, et al., "Cache Management in CORBA Distributed Object Systems", pp. 1-10.
U.S. Appl. No. 13/352,218, filed Jan. 17, 2012, entitled "Cache Management of Track Removal in a Cache for Storage" invented by Benhase, M.T. and L.M. Gupta, Total 32 pp. [18.429 (Appln)].

* cited by examiner

First Cache Control Block

Spatial Index Entry

CACHE MANAGEMENT OF TRACK REMOVAL IN A CACHE FOR STORAGE

RELATED APPLICATION

The present application is a continuation application of copending application Ser. No. 13/352,218, filed Jan. 17, 2012, entitled "CACHE MANAGEMENT OF TRACK REMOVAL IN A CACHE FOR STORAGE," assigned to the assignee of the present application, and incorporated by reference in its entirety.

BACKGROUND

1. Field of the Invention

The present invention relates to a method for cache management of track removal in a cache for a storage.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device, or read data. In the commonly used Least Recently Used (LRU) cache technique, if a track in the cache is accessed, i.e., a cache "hit", then the entry in the LRU list for the accessed track is moved by a cache manager to a Most Recently Used (MRU) end of the list. If the requested track is not in the cache, i.e., a cache miss, then the track in the cache whose entry is at the LRU end of the list may be removed.

One removal operation, often referred to as demoting a track, simply deletes the track from cache. For example, a track containing read data may be demoted by a cache manager. Another track removal operation destages the track from cache for sending the track to storage. For example, a track containing write data may be destaged from cache by the cache manager for storing in storage.

In a typical LRU cache technique, an entry for a track data staged into cache from the storage is usually added to the MRU end of the LRU list. Consequently, tracks that are more frequently accessed are likely to remain in cache, while data less frequently accessed will more likely be removed from the LRU end of the list to make room in cache for newly accessed tracks.

The cache manager scans the list of tracks to identify tracks that can be demoted or destaged. The cache manager typically uses a "lock," often referred to as an "LRU lock" to lock the list to prevent modification of the list by other processors while the scan is in progress. In many LRU cache techniques, the cache manager holds the LRU lock for the full duration of the scan. In addition, should a track be identified for removal from the cache, the cache manager typically continues to hold the LRU lock for the demotion or destaging process which is usually undertaken as the scan progresses.

The cache manager may hold the lock for other cache management operations. For example, after a track in cache has been accessed in a read or write operation, the cache manager typically holds the lock while the entry position for that track in the list is moved by the cache manager to the MRU end of the list.

The duration of time that the cache manager holds the lock, preventing access to the list by other processors, tends to be relatively long for list scanning and track removal operations. The duration of time that the cache manager holds the lock for a typical MRU operation tends to be relatively short but they can be relatively frequent in number.

Other techniques may also be used to manage track removal from a cache. For example, tracks which have been accessed may be marked as "accessed" using a recency bit.

SUMMARY

In one aspect of the present description, operations are described for managing a cache in a data storage system. In one embodiment, operations include maintaining in a cache, tracks in the storage subject to Input/Output (I/O) requests, scanning a list of tracks in cache to identify candidates for cache removal processing which includes one of demoting an identified track from the cache, and destaging an identified track to storage, locking the list to prevent access to the list by other processors while the list of tracks is being scanned, identifying a track of the list of tracks to be cache removal processed, interrupting the scanning of the list of tracks, storing a pointer to a position in the list of tracks as a function of the position in the list at which the scanning was interrupted, releasing the locking of the list to allow access to the list by other processors while the identified track is being cache removal processed, and cache removal processing the identified track by one of demoting the identified track from the cache, and destaging the identified track to storage.

In another aspect, further operations are described comprising resuming locking of the list to prevent access to the list by other processors while the list of tracks is being scanned, and resuming the scanning of the list of tracks at a position in the list as a function of the stored pointer.

In still another aspect, the aforementioned list has a least recently used (LRU) end and a most recently used (MRU) end and the aforementioned scanning is LRU scanning which includes identifying least recently used (LRU) tracks and LRU updating the list and the aforementioned LRU updating includes moving the position of LRU identified tracks on the list towards the LRU end of the list.

In yet another aspect, further operations are described comprising I/O processing a track on the list in cache wherein the I/O processing includes one of reading from and writing to the track being I/O processed, locking the list to prevent access to the list by other processors while the list of tracks is being updated, MRU updating the list wherein said MRU updating includes identifying an I/O processed track as an MRU track and moving the position of MRU identified tracks on the list towards the MRU end of the list, and releasing the locking of the list to allow access to the list by other processors.

In still another aspect, the aforementioned MRU updating includes determining if the pointer points to a position on the list occupied by an MRU identified track, the list position of which is to be moved toward the MRU end of the list, and if so, updating the pointer to point to a previous position on the list.

In yet another aspect, further operations are described comprising initiating a timer upon initiation of scanning to time a predetermined period of time, initiating the scanning of the list of tracks at a position in the list as a function of the stored pointer, and upon expiration of the predetermined period of time: interrupting the scanning of the list of tracks, storing a pointer to a position in the list of tracks as a function of the position in the list at which the scanning was interrupted, and releasing the locking of the list to allow access to the list by other processors.

In yet another aspect, further operations are described comprising setting a quota of tracks for cache removal processing, initiating a count of tracks being cache removal processed upon initiation of scanning, initiating the scanning of the list of tracks at a position in the list as a function of the stored pointer, and incrementing the count each time a track is processed by cache removal processing, comparing the count to the quota, and upon reaching the quota, interrupting the scanning of the list of tracks, storing a pointer to a position in the list of tracks as a function of the position in the list at which the scanning was interrupted, and releasing the locking of the list to allow access to the list by other processors.

Other features and aspects may be realized, depending upon the particular application.

DETAILED DESCRIPTION

As explained in greater detail below, in one embodiment, a cache manager releases a list lock during a scan when a track has been identified as a track for cache removal processing such as demoting the track, for example. By releasing the list lock, the cache manager allows other processors to have access to the list while the identified track is processed for cache removal. In one aspect, before the list lock is released, the position of the previous entry in the list may be stored in a cursor or pointer so that the pointer value points to the prior entry in the list. Once the list lock is released, the track identified for cache removal processing may be processed to remove the track from cache. For cache removal processing which demotes a track, the track number is removed from the list and the track itself is deleted from cache. For cache removal processing which destages a track, the track number is removed from the list and the track itself is written back to storage and deleted from cache.

Once the cache removal processing of the identified track is completed, the list lock may be reacquired and the scan may be resumed at the list entry identified by the pointer. Should another processor remove or otherwise modify the list entry identified by the pointer from the list, the pointer may be readjusted to point to the previous track or another suitable entry when scanning resumes.

Figure 1:
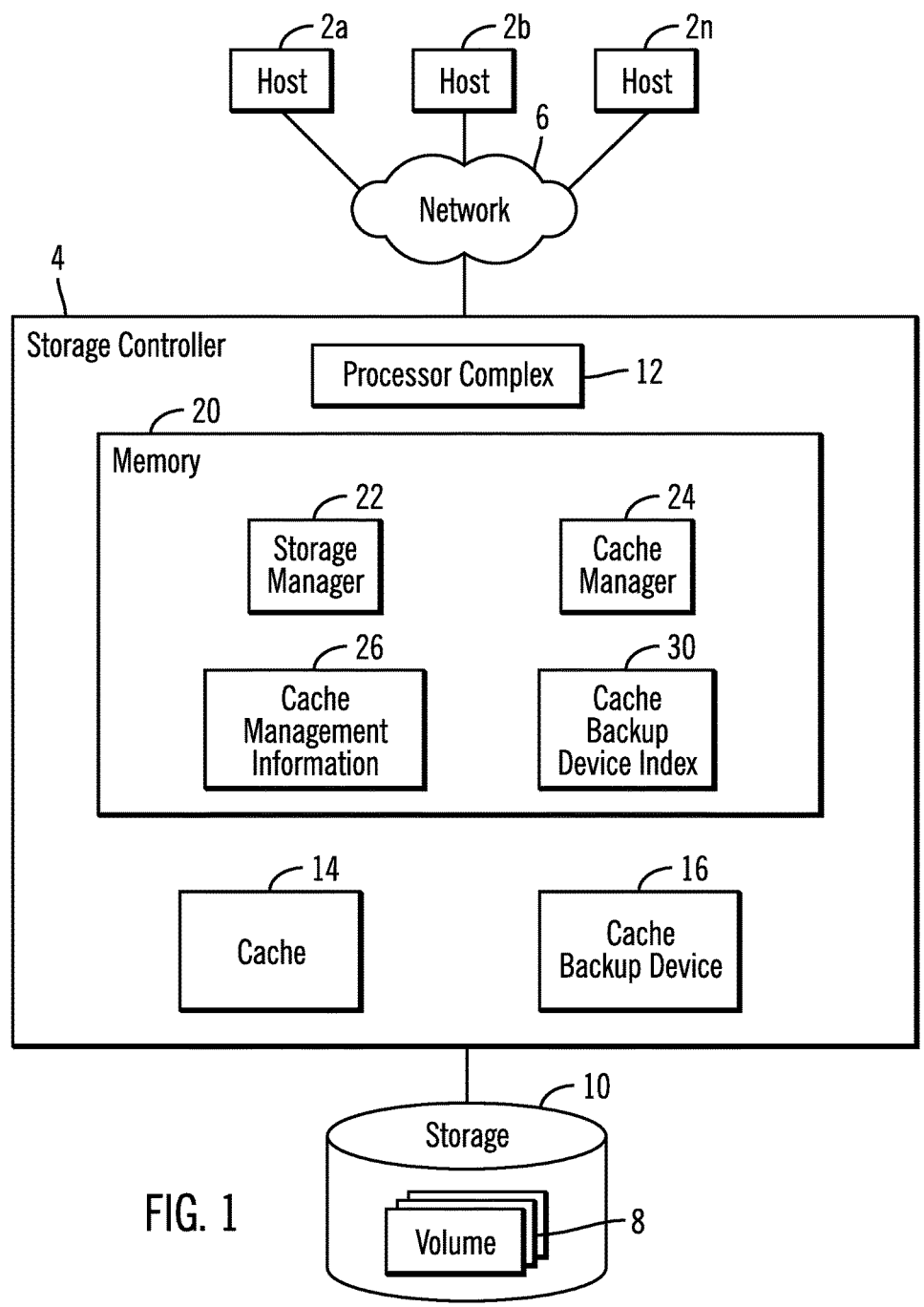
FIG. 1 illustrates an embodiment of a computing environment.

FIG. 1 illustrates an embodiment of a computing environment. A plurality of hosts 2a, 2b . . . 2n may submit Input/Output (I/O) requests to a storage controller 4 over a network 6 to access data at volumes 8 (e.g., Logical Unit Numbers, Logical Devices, Logical Subsystems, etc.) in a storage 10. The storage controller 4 includes a processor complex 12, including one or more processors with single or multiple cores, one or more caches 14, one or more cache backup devices 16, to backup tracks in the cache 14. The cache 14 caches cache data transferred between the hosts 2a, 2b . . . 2n and the storage 10. In this manner, the cache 14 maintains tracks in the storage subject to Input/Output (I/O) requests. The cache backup device 16 may provide non-volatile storage of tracks in the cache 14. In a further embodiment, the cache backup device 16 may be located in a cluster or hardware on a different power boundary than that of the cache 14.

The storage controller 4 has a memory 20 that includes a storage manager 22 for managing the transfer of tracks transferred between the hosts 2a, 2b . . . 2n and the storage 10 and a cache manager 24 that manages data transferred between the hosts 2a, 2b . . . 2n and the storage 10 in the cache 14 and a cache backup device 16. A track may comprise any unit of data configured in the storage 10, such as a track, Logical Block Address (LBA), etc., which is part of a larger grouping of tracks, such as a volume, logical device, etc. The cache manager 24 maintains cache management information 26 to manage read (unmodified) and write (modified) tracks in the cache 14. A cache backup device index 30 provides an index of track identifiers to a location in the cache backup device 16.

The storage manager 22 and cache manager 24 are shown in FIG. 1 as program code loaded into the memory 20 and executed by the processor complex 12. Alternatively, some or all of the functions may be implemented in hardware devices in the storage controller 4, such as in Application Specific Integrated Circuits (ASICs).

In some embodiments, the cache 14 may store tracks in a log structured array (LSA), where tracks are written in a sequential order as received, thus providing a temporal ordering of the tracks written to the cache 14. In a LSA, later versions of tracks already present in the LSA are written at the end of the LSA. In alternative embodiments, the cache 14 may store data in formats other than in an LSA.

In one embodiment, the cache 14 may comprise a Random Access Memory (RAM), such as a Dynamic Random Access Memory (DRAM), or may comprise a flash memory, such as a solid state device, or both, and the storage 10 is comprised of one or more sequential access storage devices, such as hard disk drives and magnetic tape. The storage 10 may comprise a single sequential access storage device or may comprise an array of storage devices, such as a Just a Bunch of Disks (JBOD), Direct Access Storage Device (DASD), Redundant Array of Independent Disks (RAID) array, virtualization device, etc. In one embodiment, the cache 14 is a faster access device than the storage 10. Further, the cache 14 may have a greater cost per unit of storage than storage devices in the storage 10.

The cache 14 may be part of the memory 20 or implemented in a separate memory device, such as a DRAM. In one embodiment, the cache backup device 16 may comprise a non-volatile backup storage (NVS), such as a non-volatile memory, e.g., battery backed-up Random Access Memory (RAM), static RAM (SRAM), etc.

The network 6 may comprise a Storage Area Network (SAN), a Local Area Network (LAN), a Wide Area Network (WAN), the Internet, and Intranet, etc.

Figure 2:
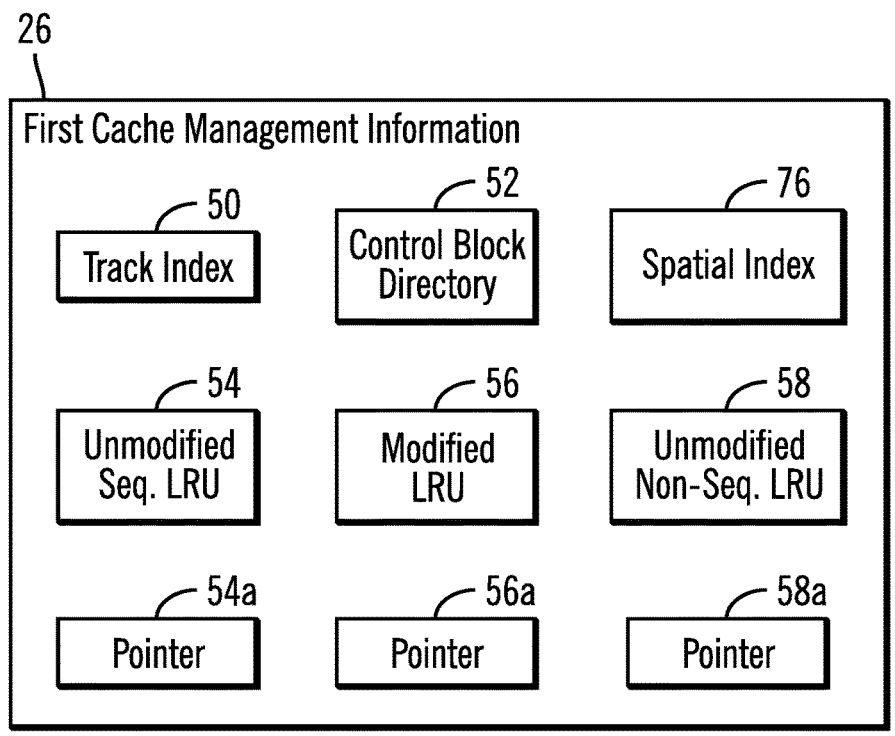
FIG. 2 illustrates an embodiment of cache management information.

FIG. 2 illustrates an embodiment of the cache management information 26 including a track index 50 providing an index of tracks in the cache 14 to control blocks in a control block directory 52; an unmodified sequential LRU list 54 providing a temporal ordering of unmodified sequential tracks in the cache 14; a modified LRU list 56 providing a temporal ordering of modified sequential and non-sequential tracks in the cache 14; and an unmodified non-sequential LRU list 58 providing a temporal ordering of unmodified non-sequential tracks in the cache 14. It is appreciated that a cache may have lists organized in a variety of formats, depending upon the particular application.

In certain embodiments, upon determining that the cache backup device 16 is full, the modified LRU list 56 is used to destage modified tracks from the cache 14 so that the copy of those tracks in the cache backup device 16 may be discarded to make room in the cache backup device 16 for new modified tracks. In some embodiments, the cache management information 26 may further include a spatial index 76 providing a spatial ordering of the modified tracks in the based on the physical locations in the storage 10 at which the modified tracks are stored.

Figure 2A:
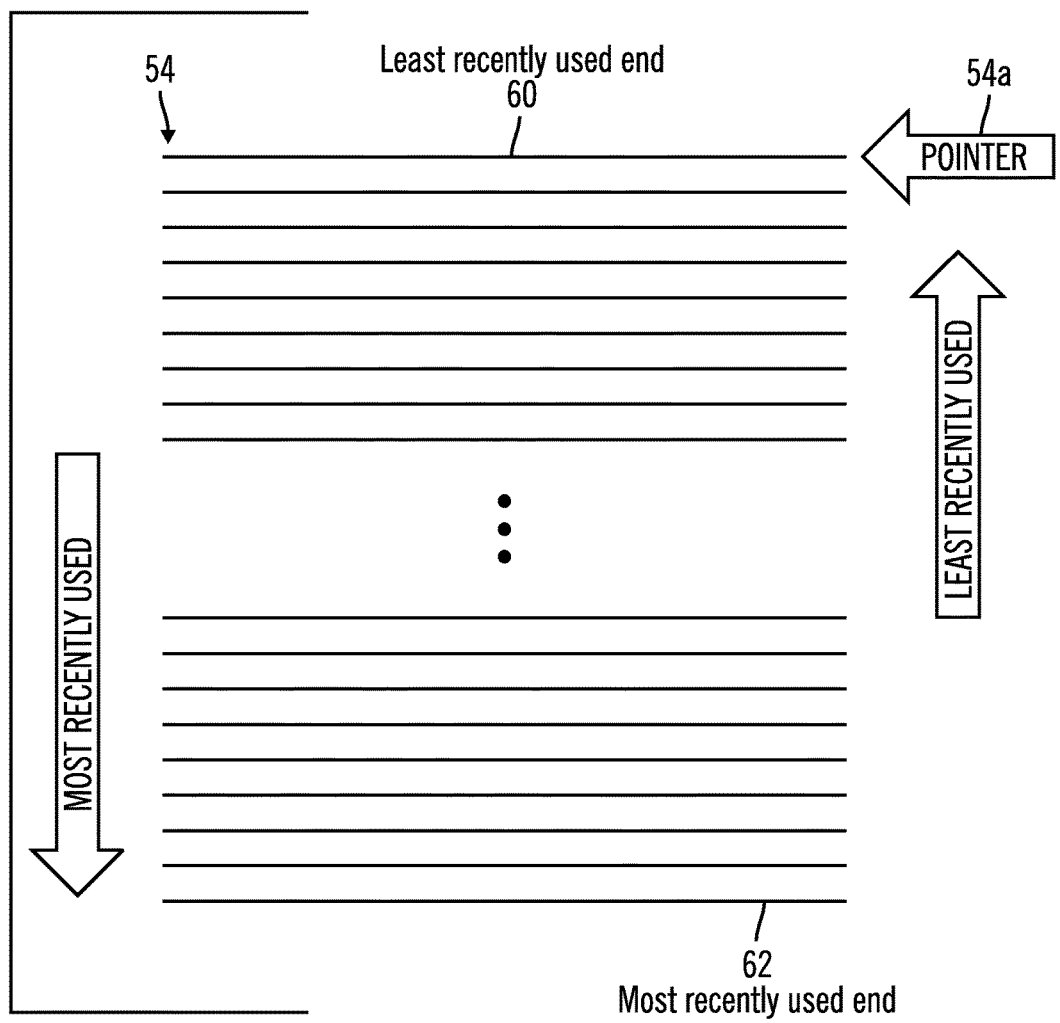
FIG. 2a illustrates an embodiment of an LRU list.

All the LRU lists 54, 56, and 58, may include the track IDs of tracks in the cache 14 and ordered according to when the identified track was last accessed. The LRU lists 54, 56, and 58, have a most recently used (MRU) end indicating a most recently accessed track and a LRU end indicating a least recently used or accessed track. FIG. 2a shows an LRU end 60 and an MRU end 62 for the LRU list 54, for example. The track IDs of tracks added to the cache 14 are added to the MRU end of the LRU list and tracks demoted from the cache 14 are accessed from the LRU end. The track index 50 and spatial index 76 may comprise a scatter index table (SIT). Alternative type data structures may be used to provide the temporal ordering of tracks in the cache 14 spatial ordering of tracks in the cache. Non-sequential tracks may comprise Online Line Transaction Processing (OLTP) tracks, which often comprise small block writes that are not fully random and have some locality of reference, i.e., have a probability of being repeatedly accessed.

In accordance with one aspect of the present description, each list 54, 56, and 58 has an associated pointer 54a, 56a, and 58a which permits a cache manager, such as the cache manager 24, to release a list lock during a scan of the associated list 54, 56, and 58, when a track has been identified as a track for cache removal processing such as demoting the track, for example. FIG. 2a shows the pointer 54a pointing to an entry at the LRU end 60 of the LRU list 54, for example. By releasing the list lock, the cache manager allows other processors to have access to the list while the identified track is processed for cache removal. In one embodiment, before the list lock is released, the position of the previous entry in the list may be stored in the associated cursor or pointer so that the pointer value points to the prior entry in the list. Once the list lock is released, the track identified for cache removal processing may be processed to remove the track from cache. Once the cache removal processing of the identified track is completed, the list lock may be reacquired and the scan may be resumed at the list entry identified by the pointer.

Figure 3:
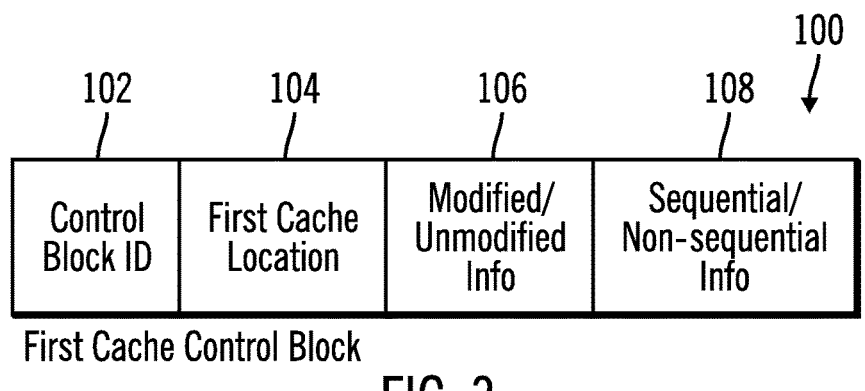
FIG. 3 illustrates an embodiment of a cache control block.
Figure 4:
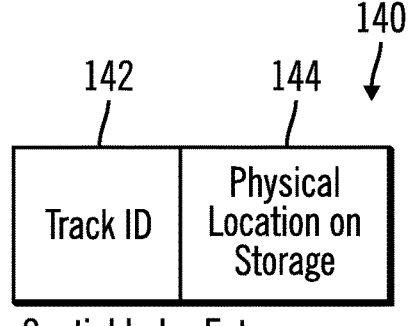
FIG. 4 illustrates an embodiment of a spatial index entry.

FIG. 3 illustrates an embodiment of a cache control block 100 entry in the control block directory 52, including a control block identifier (ID) 102, a cache location 104 of the physical location of the track in the cache 14, information 106 indicating whether the track is modified or unmodified, and information 108 indicating whether the track is a sequential or non-sequential access. In some embodiments, a control bloc entry may also be provided for an LSA location identifying where the track is located in the LSA. FIG. 4 illustrates a spatial index entry 140 including a track identifier 142 of a track in the cache 14 and the physical location 144 of where the track is stored in the storage 10, such as a cylinder, platter, block address, and storage device identifier.

Figure 5:
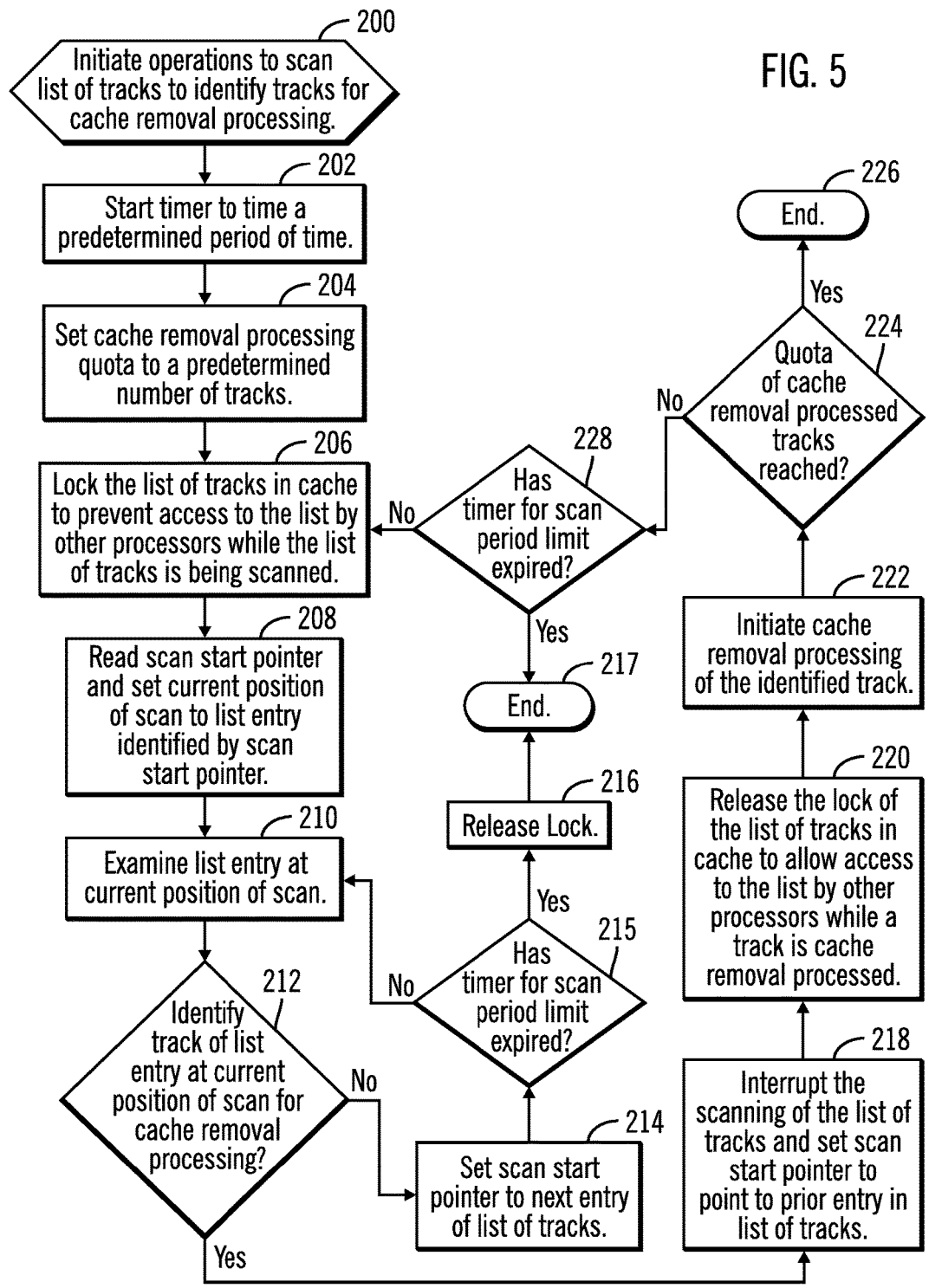
FIG. 5 illustrates an embodiment of operations to remove tracks from cache.

FIG. 5 illustrates an embodiment of operations performed by the cache manager 24 to remove tracks from the cache 14. In the illustrated embodiment, the cache removal process of FIG. 5 demotes unmodified tracks from the cache 14. However, it is appreciated that in some embodiments, other cache operations such as track destaging may be performed. Operations resulting in removal of tracks from cache may be initiated upon a determination that space is to be made available in the cache 14 so as to add new tracks to cache, for example.

Upon initiating (at block 200) an operation to identify tracks for cache removal processing to free space in the cache 14, the cache manager 24 may, in one embodiment, initiate a timer (at block 202) set for a predetermined period of time which sets a limit upon the process which has been initiated. A suitable duration of the time may be selected depending upon the particular application. In some embodiments, the duration may be variable depending upon various conditions. Other embodiments may not have time limit on processes which include cache track removal.

Further, the cache manager 24 may, in one embodiment, set a quota (at block 204) at a predetermined number of tracks which sets a limit upon the number of tracks to be removed in the course of the process which has been initiated. A suitable track number limitation may be selected depending upon the particular application. In some embodiments, the number of tracks to be removed may be variable depending upon various conditions and may be greater or fewer depending upon conditions. Other embodiments may not have a track limit on the cache removal process.

To prevent other processors from accessing and modifying the list from which the tracks to be removed are selected, the cache manager secures a list lock (block 206) such as an LRU lock for the process of FIG. 5. Thus, a list such as the unmodified sequential LRU list 54 or the unmodified non-sequential list 58 (FIG. 2), for example, may be locked by the processor performing the process of FIG. 5 preventing other processors from accessing and modifying the locked list while the list is being scanned to identify tracks for removal from the cache.

It is believed that in many prior LRU cache techniques, the cache manager holds the LRU lock for the entire duration of the scan. In addition, should a track be identified for removal from the cache, the cache manager in many prior LRU cache techniques typically continues to hold the LRU lock for the demotion or destaging process which is usually undertaken as the scan progresses. Thus, in many prior LRU cache techniques, the duration of time that the cache manager holds the lock, preventing access to the list by other processors, has tended to be relatively long for list scanning and track removal operations.

In accordance with one aspect of the present description, and as described in greater detail below, a cache manager, such as the cache manager 24, can release the list lock during a scan when a track has been identified as a track for cache removal processing such as demoting the track, for example. By releasing the list lock, the cache manager allows other processors to have access to the list while the identified track is processed for cache removal. In one embodiment, before the list lock is released, the position of the previous entry in the list may be stored in a cursor or pointer so that the pointer value points to the prior entry in the list. Once the list lock is released, the track identified for cache removal processing may be processed to remove the track from cache. For cache removal processing which demotes a track, the track number is removed from the list and the track itself is deleted from cache. For cache removal processing which destages a track, the track number is removed from the list and the track itself is written back to storage and deleted from cache.

Once the cache removal processing of the identified track is completed, the list lock may be reacquired and the scan may be resumed at the list entry identified by the pointer. Should another processor remove or otherwise modify the list entry identified by the pointer from the list, the pointer may be readjusted to point to the previous track or another suitable entry when scanning resumes.

Thus, in the embodiment, of FIG. 5, the cache manager reads (block 208) a read scan start pointer and sets the current position of the scan to the list entry identified by the scan start pointer. The value of the scan start pointer may be initialized at initialization of the scan (block 200) to an appropriate value as a function of a particular position or entry of the list to be scanned. For example, the scan start pointer may be initialized at initialization of the scan (block 200) to point to the first entry at the least recently used (LRU) end of the list, for example. Other initialization values may be selected, depending upon the particular application. In this manner, scanning of the list may be initiated at a position in the list as a function of the stored pointer.

The list entry at the current position of the scan is examined (block 210) and a determination is made (block 212) as to whether the track of the list entry at the current position of the scan should be processed for removal from the cache. If the track of the list entry at the current position of the scan is not identified for cache removal processing, the scan start pointer is set (block 214) so that the current position of the scan is moved to the next entry of the list of track to be scanned. For example, if the list is being scanned sequentially, the scan start pointer may be incremented (or decremented as appropriate) to point to the next adjacent entry of the list. Other methods may be used to set the scan start pointer to point to the next entry to be scanned, as appropriate.

The timer initialized in operation 202 may also be examined to determine if the scan period limit has expired (block 215). If so, the list lock may be released (block 216) and the scanning process terminated (block 217). In this manner, the pointer stores (block 214) a value which points to a position in the list of tracks as a function of the position in the list at which the scanning was terminated.

If the scan period limit has not expired (block 214), scanning of the list continues and the list entry at the next current position of the scan is examined (block 210) and a determination is made (block 212) as to whether the track of the list entry at the current position of the scan should be processed for removal from the cache. If the track of the list entry at the current position of the scan is identified for cache removal processing, the scanning of the list is interrupted (block 218) and the scan start pointer is set (block 218) so that the current position of the scan is moved back to the prior entry of the list of tracks to be scanned. For example, if the list is being scanned sequentially, the scan start pointer may be decremented (or incremented as appropriate) to point to the prior adjacent entry of the list. Other methods may be used to set the scan start pointer to point to the prior scanned entry, as appropriate. Other positions of the list may also be stored, depending upon the particular application. In this manner, the pointer stores (block 218) a value which points to a position in the list of tracks as a function of the position in the list at which the scanning was interrupted for cache removal processing of the identified track.

Upon resetting the scan start pointer so that the scan start pointer points to the prior entry of the list of tracks to be scanned, the list lock of the list of tracks being scanned is released (block 220) to allow access to the list by other processors while the track identified (block 212) for cache removal processing is processed (block 222). In the illustrated embodiment, the cache removal process (block 222) of FIG. 5 demotes unmodified tracks from the cache 14 and removes the identification of that track from the list being scanned. However, it is appreciated that in some embodiments, other cache operations such as track destaging may be performed.

Upon completion of the cache removal processing for the identified track, a count of the number of tracks processed by cache removal processing since the scan was initiated may be incremented. In addition, a determination may be made as to whether the quota of tracks which set a limit upon the number of tracks to be removed in the course of the cache track removal process has been reached (block 224). Thus, the count of the number of tracks processed by cache removal processing since the scan was initiated may be compared to the quota. If the quota has been reached, the scan may be terminated (block 226). In this manner, the pointer stores (block 218) a value which points to a position in the list of tracks as a function of the position in the list at which the scanning was interrupted (block 218) and terminated (block 226).

If the quota has not been reached, the timer initialized in operation 202 may also be examined to determine if the scan period limit has expired (block 228). If so, the scan may be terminated (block 217). In this manner, the pointer stores (block 218) a value which points to a position in the list of tracks as a function of the position in the list at which the scanning was interrupted (block 218) and terminated (block 217). Otherwise, the cache manager can reacquire (block 206) the list lock for the process of FIG. 5, to resume locking the list to again prevent other processors from accessing and modifying the list while the scan of the list resumes (blocks 208-228).

Thus, in the embodiment, of FIG. 5, the cache manager again reads (block 208) the read scan start pointer and sets the current position of the scan to the list entry identified by the scan start pointer. In this manner, the scanning of the list is resumed at a position in the list which is a function of the stored pointer. In the embodiment of FIG. 5, as explained above, the scan start pointer has been reset (block 218) so that the current position of the scan is moved back to the prior entry of the list of tracks to be scanned since the prior current entry had been identified for cache removal processing. The scan resumes and the list entry at the current position of the scan is examined (block 210), a determination is made (block 212) as to whether the track of the list entry at the current position of the scan should be processed for removal from the cache and so on.

Figure 6:
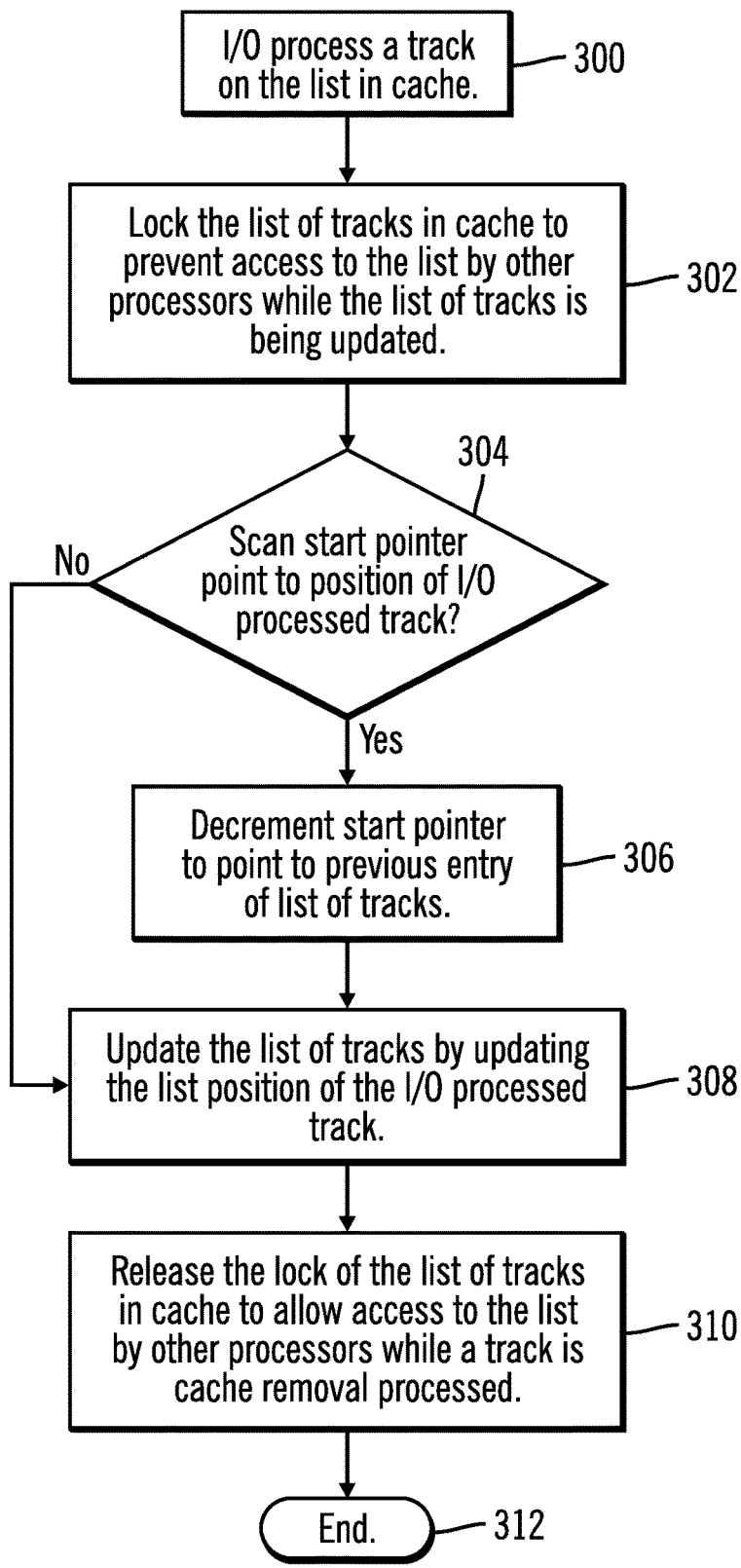
FIG. 6 illustrates an embodiment of operations to update a list of tracks in cache.

FIG. 6 illustrates an embodiment of operations performed by the cache manager 24 to update a list of tracks in cache in response to I/O processing (block 300) of a track to read data from or write data to the track being I/O processed. Thus, in response to I/O processing (block 300) of a track, the cache manager 24 secures a list lock (block 302) for the process of FIG. 6 to prevent other processors from accessing and modifying the list which is to be updated in response to I/O processing of a track on the list.

In accordance with another aspect of the present description, a determination is made as to whether (block 304) the scan start pointer points to the list position of the I/O processed track. If the value of the scan start pointer points to a list entry other than that of the track which has been I/O processed, updating (block 308) may proceed directly. On the other hand, if the value of the scan start pointer points to the list entry of the track which has been I/O processed, the scan start pointer is reset (block 306) so that the current position of the LRU scan (FIG. 5) when the LRU scan is resumed will be moved back to the prior entry of the list of tracks to be scanned.

For example, if the LRU scanning of the list proceeds in a sequential fashion and list positions are numbered sequentially, the scan start pointer may be decremented (or incremented as appropriate) to point to the prior adjacent entry of the list. Other methods may be used to set the scan start pointer to point to the prior scanned entry, as appropriate. Other positions of the list may also be stored, depending upon the particular application. In this manner, the pointer stores (block 306) a value which points to a position in the list of tracks as a function of the position in the list as a function of the list entry for the track which was the subject of an IO operation.

In the illustrated embodiment, the list entry of the track which has been I/O processed is updated (block 308) by a most recently used (MRU) updating process which moves the list entry to the MRU end of the list. Upon the completion of the MRU updating or other updating of the list, the list lock for the list of tracks being updated may be released (block 310) to allow access to the list by other processors, and the updating process may be terminated (block 312).

Described embodiments provide a cache manager, such as the cache manager 24, which can release the list lock during a scan when a track has been identified as a track for cache removal processing such as demoting the track, for example. By releasing the list lock, the cache manager allows other processors to have access to the list while the identified track is processed for cache removal. In one embodiment, before the list lock is released, the position of the previous entry in the list may be stored in a cursor or pointer so that the pointer value points to the prior entry in the list. Once the list lock is released, the track identified for cache removal processing may be processed to remove the track from cache. For cache removal processing which demotes a track, the track number is removed from the list and the track itself is deleted from cache. For cache removal processing which destages a track, the track number is removed from the list and the track itself is written back to storage and deleted from cache.

Once the cache removal processing of the identified track is completed, the list lock may be reacquired and the scan may be resumed at the list entry identified by the pointer. Should another processor remove or otherwise modify the list entry identified by the pointer from the list, the pointer may be readjusted to point to the previous track or another suitable entry when scanning resumes.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    maintaining in a cache, tracks in the storage subject to Input/Output (I/O) requests;
    scanning a list of tracks in cache to identify candidates for cache removal processing which includes one of demoting an identified track from the cache, and destaging an identified track to storage;
    locking the list to prevent access to the list by other processors while the list of tracks is being scanned;
    identifying a track of the list of tracks to be cache removal processed;
    in response to an identification of a track of the list of tracks to be cache removal processed:
        interrupting the scanning of the list of tracks;
        storing a pointer to a position in the list of tracks as a function of the position in the list at which the scanning was interrupted;
        releasing the locking of the list to allow access to the list by other processors while the identified track is being cache removal processed; and
        in response to releasing the locking of the list, cache removal processing the identified track by one of demoting the identified track from the cache, and destaging the identified track to storage;
    initiating a timer upon initiation of scanning to time a predetermined period of time; and
    upon expiration of the predetermined period of time:
        interrupting the scanning of the list of tracks;
        storing a pointer to a position in the list of tracks as a function of the position in the list at which the scanning was interrupted; and
        releasing the locking of the list to allow access to the list by other processors.

2. The method of claim 1 further comprising:
    resuming locking of the list to prevent access to the list by other processors while the list of tracks is being scanned; and resuming the scanning of the list of tracks at a position in the list as a function of the stored pointer.

3. The method of claim 1 wherein said list has a least recently used (LRU) end and a most recently used (MRU) end and wherein said scanning is LRU scanning which includes identifying least recently used (LRU) tracks and LRU updating the list wherein said LRU updating includes moving the position of LRU identified tracks on the list towards the LRU end of the list.

4. The method of claim 3 further comprising:
I/O processing a track on the list in cache wherein the I/O processing includes one of reading from and writing to the track being I/O processed;
locking the list to prevent access to the list by other processors while the list of tracks is being updated;
MRU updating the list wherein said MRU updating includes identifying an I/O processed track as an MRU track and moving the position of MRU identified tracks on the list towards the MRU end of the list; and
releasing the locking of the list to allow access to the list by other processors.

5. The method of claim 4 further comprising wherein said MRU updating includes determining if the pointer points to a position on the list occupied by an MRU identified track, the list position of which is to be moved toward the MRU end of the list, and if so, updating the pointer to point to a previous position on the list.

6. The method of claim 2 further comprising:
initiating a timer upon resuming of scanning to time a predetermined period of time;
initiating the scanning of the list of tracks at a position in the list as a function of the stored pointer; and
upon expiration of the predetermined period of time:
   interrupting the scanning of the list of tracks;
   storing a pointer to a position in the list of tracks as a function of the position in the list at which the scanning was interrupted; and
   releasing the locking of the list to allow access to the list by other processors.

7. The method of claim 2 further comprising:
setting a quota of tracks for cache removal processing;
initiating a count of tracks being cache removal processed upon initiation of scanning;
initiating the scanning of the list of tracks at a position in the list as a function of the stored pointer; and
incrementing the count each time a track is processed by cache removal processing;
comparing the count to the quota; and
upon reaching the quota:
   interrupting the scanning of the list of tracks;
   storing a pointer to a position in the list of tracks as a function of the position in the list at which the scanning was interrupted; and
   releasing the locking of the list to allow access to the list by other processors.

\* \* \* \* \*